(12) United States Patent
Iarocci (10) Patent No.: US 11,192,634 B2
(45) Date of Patent: Dec. 7, 2021

(54) SYSTEM AND METHOD FOR IMPROVING THE OPERATION OF AN AIRCRAFT

(71) Applicant: BOMBARDIER INC., Dorval (CA)

(72) Inventor: Nicola Iarocci, Laval (CA)

(73) Assignee: BOMBARDIER INC., Dorval (CA)

( * ) Notice: Subject to any disclaimer, the term of this patent is extended or adjusted under 35 U.S.C. 154(b) by 435 days.

(21) Appl. No.: 16/364,687

(22) Filed: Mar. 26, 2019

(65) Prior Publication Data

US 2019/0300155 A1   Oct. 3, 2019

Related U.S. Application Data

(60) Provisional application No. 62/649,875, filed on Mar. 29, 2018.

(51) Int. Cl.
| | | |
|---|---|---|
| *B64C 13/16* | (2006.01) | |
| *B64C 3/58* | (2006.01) | |
| *B64C 30/00* | (2006.01) | |
| *B64C 9/32* | (2006.01) | |

(52) U.S. Cl.
CPC .............. *B64C 13/16* (2013.01); *B64C 3/58* (2013.01); *B64C 9/323* (2013.01); *B64C 30/00* (2013.01)

(58) Field of Classification Search
CPC .......... B64C 13/16; B64C 9/323; B64C 3/58; B64C 30/00; B64C 3/36; Y02T 50/30
See application file for complete search history.

(56) References Cited

U.S. PATENT DOCUMENTS

| | | | | |
|---|---|---|---|---|
| 3,618,880 A | * | 11/1971 | Hagaman | ................ B64C 13/22 244/113 |
| 4,591,113 A | | 5/1986 | Mabey | |
| 5,564,652 A | * | 10/1996 | Trimbath | ................... B64C 5/00 244/99.1 |
| 6,246,929 B1 | * | 6/2001 | Kaloust | ................ G05D 1/0816 244/178 |
| 6,296,202 B1 | * | 10/2001 | Stanek | ..................... B64D 1/06 244/1 N |
| 6,543,719 B1 | * | 4/2003 | Hassan | ................. B64C 27/001 244/17.13 |
| 7,048,228 B2 | * | 5/2006 | Vassberg | .................... B64C 3/28 244/35 R |
| 7,048,235 B2 | * | 5/2006 | McLean | .................... B64C 9/18 244/215 |
| 7,766,274 B1 | * | 8/2010 | Jameson | .................. B64C 27/00 244/17.11 |
| 8,706,321 B1 | | 4/2014 | Rupnik et al. | |

(Continued)

FOREIGN PATENT DOCUMENTS

| | | | | |
|---|---|---|---|---|
| CN | 103324190 A | * | 9/2013 | ........... G05D 1/0833 |
| CN | 105083536 A | * | 11/2015 | ........... G05D 1/0066 |

(Continued)

*Primary Examiner* — Behrang Badii
*Assistant Examiner* — Jalal C Coduroglu
(74) *Attorney, Agent, or Firm* — Norton Rose Fulbright Canada LLP (57) ABSTRACT

Systems and methods of improving the operation of an aircraft during flight are disclosed. In one embodiment, the method comprises deploying spoilers as the speed of the aircraft approaches the maximum operating Mach number of the aircraft, and keeping the spoilers deployed when the speed of the aircraft is substantially at the maximum operating Mach number.

23 Claims, 5 Drawing Sheets

CAUSING A DEPLOYMENT OF THE SPOILERS WHEN THE SPEED OF THE AIRCRAFT IS EQUAL TO OR EXCEEDS A SPOILER-DEPLOYMENT TRIGGER SPEED.
102

CAUSING THE SPOILERS TO REMAIN DEPLOYED WHEN THE SPEED OF THE AIRCRAFT IS BETWEEN THE SPOILER-DEPLOYMENT TRIGGER SPEED AND THE $M_{MO}$ OF THE AIRCRAFT.
104

(56) References Cited

U.S. PATENT DOCUMENTS

| | | | | |
|---|---|---|---|---|
| 8,788,122 B1* | 7/2014 | Sankrithi | ............ | G05D 1/0066 |
| | | | | 701/3 |
| 9,193,442 B1* | 11/2015 | Young | ............ | G08G 5/003 |
| 9,227,721 B1* | 1/2016 | Nguyen | ............ | B64C 3/52 |
| 9,415,860 B2 | 8/2016 | Beaufrere | | |
| 9,656,741 B2* | 5/2017 | Moser | ............ | B64C 13/0427 |
| 9,821,903 B2 | 11/2017 | Pachikara et al. | | |
| 2005/0051666 A1* | 3/2005 | Lee | ............ | B64C 30/00 |
| | | | | 244/10 |
| 2005/0121555 A1* | 6/2005 | Morgenstern | ............ | B64C 1/0009 |
| | | | | 244/130 |
| 2005/0242243 A1* | 11/2005 | Seve | ............ | B64C 9/323 |
| | | | | 244/213 |
| 2006/0049304 A1* | 3/2006 | Sanders, Jr. | ............ | B64C 39/024 |
| | | | | 244/23 A |
| 2006/0049308 A1* | 3/2006 | Good | ............ | B64C 13/26 |
| | | | | 244/76 A |
| 2007/0136030 A1* | 6/2007 | Delaplace | ............ | B64D 43/02 |
| | | | | 703/1 |
| 2010/0100260 A1* | 4/2010 | McIntyre | ............ | G01P 5/16 |
| | | | | 701/6 |
| 2014/0239126 A1* | 8/2014 | Hara | ............ | B64C 9/32 |
| | | | | 244/203 |
| 2014/0346279 A1* | 11/2014 | Foo | ............ | B64D 39/02 |
| | | | | 244/135 A |
| 2015/0102166 A1* | 4/2015 | Moser | ............ | B64C 13/34 |
| | | | | 244/110 D |
| 2015/0105945 A1* | 4/2015 | Moser | ............ | B64C 13/0425 |
| | | | | 701/3 |
| 2016/0031546 A1* | 2/2016 | Rolston | ............ | B64C 3/58 |
| | | | | 244/213 |
| 2016/0236790 A1* | 8/2016 | Knapp | ............ | B64C 11/001 |
| 2017/0001724 A1* | 1/2017 | Yates | ............ | B64D 17/80 |

FOREIGN PATENT DOCUMENTS

| | | | | | |
|---|---|---|---|---|---|
| EP | 2851292 A1 | * | 3/2015 | ............ | B64C 13/16 |
| ES | 2385403 T3 | * | 7/2012 | ............ | G01C 23/005 |
| FR | 2963859 A1 | * | 2/2012 | ............ | G07C 5/008 |
| WO | WO-0077586 A2 | * | 12/2000 | ............ | G05D 1/0816 |
| WO | WO-2004041640 A2 | * | 5/2004 | ............ | B64C 21/02 |
| WO | WO-2005002962 A1 | * | 1/2005 | ............ | B64C 3/28 |
| WO | WO-2005047105 A2 | * | 5/2005 | ............ | B64C 30/00 |
| WO | WO-2005065071 A2 | * | 7/2005 | ............ | B64C 17/10 |
| WO | WO-2005072233 A2 | * | 8/2005 | ............ | B64C 27/12 |
| WO | WO-2016093905 A1 | * | 6/2016 | ............ | G08G 5/0052 |
| WO | WO-2017134666 A1 | * | 8/2017 | ............ | F15D 1/005 |
| WO | WO-2017149526 A2 | * | 9/2017 | ............ | G01B 15/00 |

* cited by examiner

> CAUSING A DEPLOYMENT OF THE SPOILERS WHEN THE SPEED OF THE AIRCRAFT IS EQUAL TO OR EXCEEDS A SPOILER-DEPLOYMENT TRIGGER SPEED.
> 102

↓

> CAUSING THE SPOILERS TO REMAIN DEPLOYED WHEN THE SPEED OF THE AIRCRAFT IS BETWEEN THE SPOILER-DEPLOYMENT TRIGGER SPEED AND THE $M_{MO}$ OF THE AIRCRAFT.
> 104

> DEPLOYING THE SPOILERS AS A SPEED OF THE AIRCRAFT APPROACHES THE $M_{MO}$ OF THE AIRCRAFT.
> 202

↓

> KEEPING THE SPOILERS DEPLOYED WHEN THE SPEED OF THE AIRCRAFT IS SUBTANTIALLY AT THE $M_{MO}$ OF THE AIRCRAFT.
> 204

FIG. 4

| ALTITUDE RANGE | SPOILER-DEPLOYMENT TRIGGER SPEED | MAXIMUM OPERATING MACH NUMBER ($M_{MO}$) |
|---|---|---|
| A1-A2 | TS1 | $M_{MO}1$ |
| A3-A4 | TS2 | $M_{MO}2$ |
| A5-A6 | TS3 | $M_{MO}3$ |

SYSTEM AND METHOD FOR IMPROVING THE OPERATION OF AN AIRCRAFT

CROSS REFERENCE TO RELATED APPLICATION AND CLAIM OF PRIORITY

The present application claims priority to U.S. provisional patent application No. 62/649,875 filed on Mar. 29, 2018, the entire contents of which are hereby incorporated by reference.

TECHNICAL FIELD

The disclosure relates generally to aircraft, and more particularly to improving the operation of aircraft.

BACKGROUND

As an aircraft in flight approaches the speed of sound, air flowing over low-pressure areas of its surface can locally reach the speed of sound and thereby form undesirable shock waves which can affect the stability of the aircraft. The indicated airspeed can change with ambient temperature, which in turn changes with altitude. Therefore, the indicated airspeed is not always an adequate indication for warning the pilot of an impending problem. The Mach number can be more useful and some high-speed aircraft are limited to a maximum operating Mach number $M_{MO}$. The $M_{MO}$ serves as an upper limit for the allowable cruise speed of the aircraft. For the sake of performance and marketability, it can be desirable for some high-speed aircraft to have a relatively high $M_{MO}$.

SUMMARY

In one aspect, the disclosure describes a method of improving the stability of an aircraft during flight. The method comprises:

using data indicative of a speed of the aircraft during flight, automatically causing a deployment of spoilers movably attached to wings of the aircraft when the speed of the aircraft is equal to or exceeds a spoiler-deployment trigger speed that is lower than a maximum operating Mach number of the aircraft; and causing the spoilers to remain deployed when the speed of the aircraft is between the spoiler-deployment trigger speed and the maximum operating Mach number of the aircraft.

The spoilers may include a first spoiler of a port-side wing and a counterpart second spoiler of a starboard-side wing.

Causing the deployment of the spoilers may include causing the first and second spoilers to be deployed to a same deployment amount. The same deployment amount may be about 12.5% of a maximum deployment amount of the spoilers. The same deployment amount may be less than 30% of a maximum deployment amount of the spoilers. The same deployment amount may be between 6% and 20% of a maximum deployment amount of the spoilers. The same deployment amount may be about 5 degrees. The same deployment amount may be less than 15 degrees. The same deployment amount may be between 3 and 10 degrees.

The method may comprise automatically causing the deployment of the spoilers when the speed of the aircraft is equal to or exceeds the spoiler-deployment trigger speed and when the aircraft is in a cruise phase of flight.

The method may comprise, after causing the spoilers to remain deployed, causing the spoilers to fully retract when the speed of the aircraft is below the spoiler-deployment trigger speed.

The spoiler-deployment trigger speed may be between 0.25% and 12% of the maximum operating Mach number of the aircraft. The spoiler-deployment trigger speed may be between 0.5% and 5% of the maximum operating Mach number of the aircraft.

Automatically causing the deployment of spoilers may comprise causing symmetric deployment of one or more spoilers of a port-side wing of the aircraft and one or more spoilers of a starboard-side wing of the aircraft.

The method may comprise keeping the spoilers deployed to a fixed deployment amount while the speed of the aircraft is between the spoiler-deployment trigger speed and the maximum operating Mach number of the aircraft.

Embodiments can include combinations of the above features.

In another aspect, the disclosure describes a system for improving the stability of an aircraft during flight. The system comprises one or more controllers for controlling an actuation of a plurality of spoilers movably attached to wings of the aircraft. The one or more controllers are configured to:

using data indicative of a speed of the aircraft during flight, automatically command a deployment of the spoilers when the speed of the aircraft is equal to or exceeds a spoiler-deployment trigger speed that is lower than a maximum operating Mach number of the aircraft; and cause the spoilers to remain deployed when the speed of the aircraft is between the spoiler-deployment trigger speed and the maximum operating Mach number of the aircraft.

The spoilers may include a first spoiler of a port-side wing and a counterpart second spoiler of a starboard-side wing.

Automatically commanding the deployment of the spoilers may include commanding a deployment of the first and second spoilers to a same deployment amount.

The same deployment amount may be about 12.5% of a maximum deployment amount of the spoilers. The same deployment amount may be less than 30% of a maximum deployment amount of the spoilers. The same deployment amount may be between 6% and 20% of a maximum deployment amount of the spoilers. The same deployment amount may be about 5 degrees. The same deployment amount may be less than 15 degrees. The same deployment amount may be between 3 and 10 degrees.

The one or more controllers may be configured to automatically command the deployment of the spoilers when the speed of the aircraft is equal to or exceeds the spoiler-deployment trigger speed and when the aircraft is in a cruise phase of flight.

The one or more controllers may be configured to, after causing the spoilers to remain deployed, cause the spoilers to fully retract when the speed of the aircraft is below the spoiler-deployment trigger speed.

The spoiler-deployment trigger speed may be between 0.25% and 12% of the maximum operating Mach number of the aircraft. The spoiler-deployment trigger speed may be between 0.5% and 5% of the maximum operating Mach number of the aircraft.

Automatically commanding the deployment of spoilers may comprise commanding symmetric deployment of one or more spoilers of a port-side wing of the aircraft and one or more spoilers of a starboard-side wing of the aircraft.

The one or more controllers may be configured to cause keeping the spoilers deployed to a fixed deployment amount while the speed of the aircraft is between the spoiler-deployment trigger speed and the maximum operating Mach number of the aircraft.

Embodiments can include combinations of the above features.

In a further aspect, the disclosure describes an aircraft comprising a system as disclosed herein.

In a further aspect, the disclosure describes a method of improving the stability of an aircraft during flight. The method comprises:

deploying spoilers movably attached to wings of the aircraft as a speed of the aircraft approaches a maximum operating Mach number of the aircraft; and keeping the spoilers deployed when the speed of the aircraft is substantially at the maximum operating Mach number of the aircraft.

Deploying the spoilers may comprise deploying one or more spoilers of a port-side wing of the aircraft and one or more spoilers of a starboard-side wing of the aircraft to a same deployment amount.

The same deployment amount may be about 5 degrees. The same deployment amount may be between 3 and 10 degrees.

The method may comprise keeping the spoilers deployed to a fixed deployment amount while the speed of the aircraft is substantially at the maximum operating Mach number of the aircraft.

Embodiments can include combinations of the above features.

In a further aspect, the disclosure describes a method of improving the operation of an aircraft during flight. The method comprises:

using data indicative of a speed of the aircraft during flight, automatically causing a deployment of flight control surfaces movably attached to wings of the aircraft when the speed of the aircraft is equal to or exceeds a deployment trigger speed that is lower than a maximum operating Mach number of the aircraft; and causing the flight control surfaces to remain deployed when the speed of the aircraft is between the deployment trigger speed and the maximum operating Mach number of the aircraft.

The flight control surfaces may include a first flight control surface of a port-side wing and a counterpart second flight control surface of a starboard-side wing.

Causing the deployment of the flight control surfaces may include causing the first and second flight control surfaces to be deployed to a same deployment amount.

The method may comprise automatically causing the deployment of the flight control surfaces when the speed of the aircraft is equal to or exceeds the deployment trigger speed and when the aircraft is in a cruise phase of flight.

The method may comprise, after causing the flight control surfaces to remain deployed, causing the flight control surfaces to fully retract when the speed of the aircraft is below the deployment trigger speed.

Automatically causing the deployment of flight control surfaces may comprise causing symmetric deployment of one or more flight control surfaces of a port-side wing of the aircraft and one or more flight control surfaces of a starboard-side wing of the aircraft.

The method may comprise keeping the flight control surfaces deployed to a fixed deployment amount while the speed of the aircraft is between the deployment trigger speed and the maximum operating Mach number of the aircraft.

The flight control surfaces may include one or more of the following: spoilers, flaps and ailerons.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following description relates to methods and system for improving the operation of an aircraft during relatively high-speed flight. In various embodiments, the methods and systems disclosed herein make use of a relatively small and symmetric flight control surface deployment/actuation in order to improve the flow conditions over the wings of an aircraft and allow for the use of a higher maximum operating Mach number ($M_{MO}$) for the aircraft than would otherwise be certifiable without such deployment of the flight control surfaces. In various embodiments, such deployment of the flight control surfaces may improve static lateral stability, reduce drag and/or increase a buffet boundary of the aircraft during flight.

In some embodiments, the method comprises: deploying spoilers (and/or other flight control surfaces) movably attached to wings of the aircraft as a speed of the aircraft approaches a maximum operating Mach number of the aircraft; and keeping the spoilers (and/or other flight control surfaces) deployed when the speed of the aircraft is substantially at the $M_{MO}$ of the aircraft. The $M_{MO}$ serves as an upper limit for the allowable cruise speed of an aircraft and is the aircraft's maximum certified cruising Mach number. The $M_{MO}$ is defined in regulations of applicable certification authorities such as the Federal Aviation Administration (FAA) of the United States for example and corresponds to an operating limit Mach number that requires, for example, that static lateral stability of an aircraft be, at worst, neutral at $M_{MO}$. The $M_{MO}$ also corresponds to a speed above which one or more regulations of an applicable certification authority would not be complied with. In some situations, an excursion beyond the $M_{MO}$, could cause induced flow separation of boundary layer air over the wings of an airplane which could lead to lateral instability, buffeting and increased drag.

The static lateral stability of an aircraft is a fundamental aerodynamic property associated with the aircraft configuration, and is linked to the wing design. For a stable configuration in a side slip condition for example, the leading wing should produce higher lift than the trailing wing and control forces (e.g., using aileron, rudder) can be applied in a conventional sense to counter this effect. However, in some situations and for some wing designs, it was observed that negative static lateral stability, or opposite roll response to what is expected, can manifest itself at a high Mach number as a result of shock-induced flow separation on the wing. In such conditions, the leading wing in a side slip produces stronger shocks while the trailing wing sees a reduction in shock strength. The stronger shocks increase the flow separation on the leading wing thereby reducing lift instead of increasing lift. Conversely, the trailing wing may yield less lift reduction in side slip as weaker shocks may result in reduced flow separation. Such flow characteristics can therefore result in a behaviour (e.g., rolling motion) of the aircraft that is counterintuitive to the pilots. The shock-induced flow separation can potentially also cause buffeting and be a source of increased aircraft drag.

The use of a relatively small symmetrical control surface (e.g., multi-function spoiler, flap, aileron and/or spoileron) deflection above a certain speed of the aircraft was found to, in some situations, mitigate the instability and/or other negative effect(s) caused by the shock-induced flow separation in specific areas of the wing without prohibitively increasing drag. Aspects of various embodiments are described through reference to the drawings.

Figure 1:
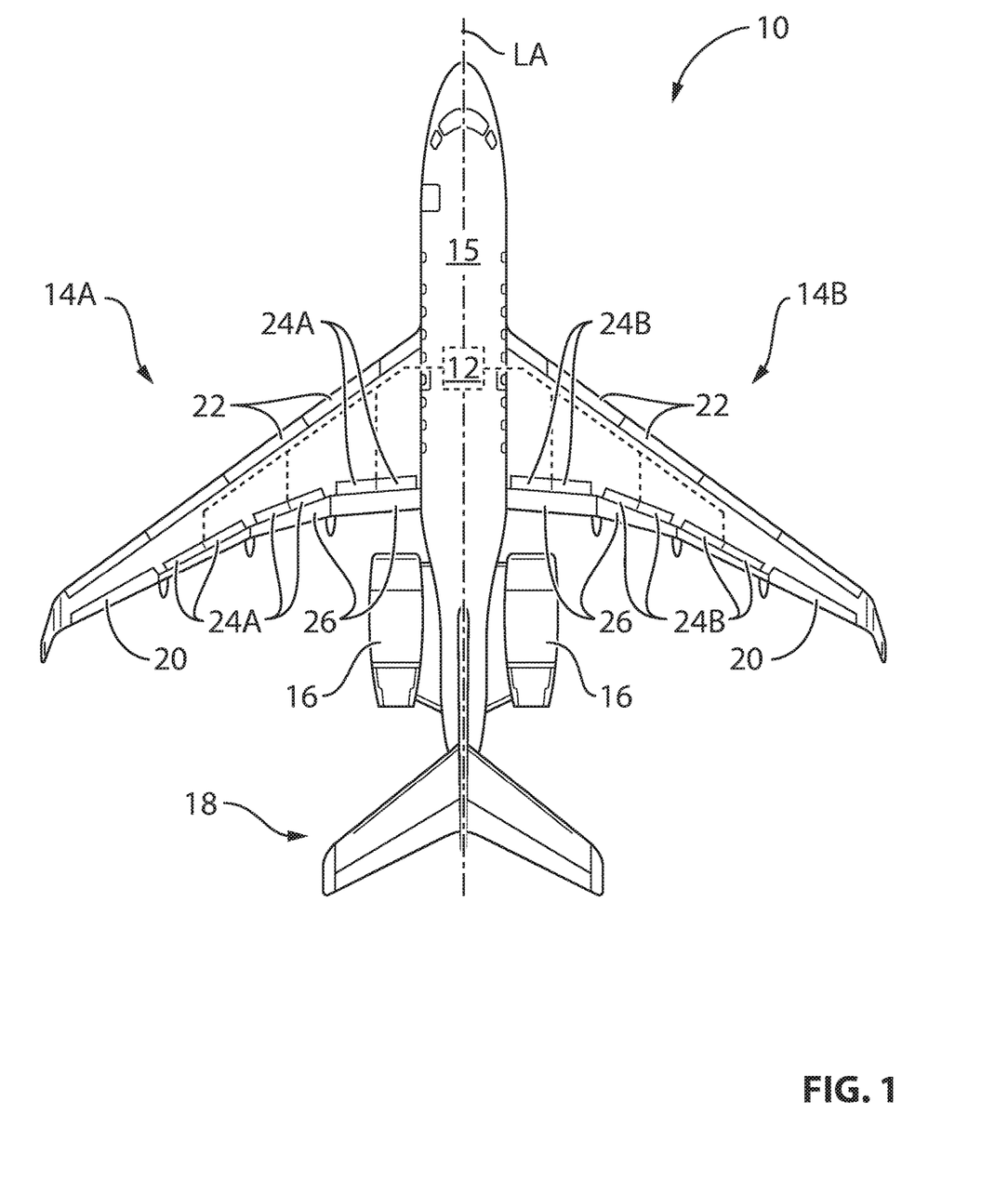
FIG. 1 is a top plan view of an exemplary aircraft comprising a system for improving the operation of the aircraft.

FIG. 1 is a top plan view of an exemplary aircraft 10, which comprises system 12 for improving the operation (e.g., static lateral stability, buffet boundary, drag) of aircraft 10 at relatively high speed such as near and at $M_{MO}$. Aircraft 10 may be any type of aircraft such as corporate (e.g., business jet), private, commercial and passenger aircraft suitable for civil aviation. For example, aircraft 10 may be a narrow-body, twin-engine jet airliner or may be an ultra-long range business jet. Aircraft 10 may be a fixed-wing aircraft.

Aircraft 10 may comprise wings 14A and 14B (also referred generally herein as "wings 14"), fuselage 15, one or more engines 16 and empennage 18. One or more of engines 16 may be mounted to fuselage 15. Alternatively, or in addition, one or more of engines 16 may be mounted to wings 14. Wing 14A may be a port-side (i.e., left) wing relative to longitudinal axis LA of fuselage 15. Wing 14B may be a starboard-side (i.e., right) wing relative to longitudinal axis LA of fuselage 15. Wings 14 may each include one or more flight control surfaces such as aileron(s) 20, leading edge slat(s) 22, spoilers 24A, 24B and trailing edge flap(s) 26. Leading edge slats 22 and trailing edge flaps 26 may be considered "high-lift" flight control surfaces that may be deployed to increase the amount of lift generated by wings 15 during phase(s) of flight requiring increased lift.

Spoilers 24 can also sometimes be called "lift spoilers" or "lift dumpers" and are flight control surfaces/devices normally intended to reduce an amount of lift produced by wings 14 during flight or landing of aircraft 10. Spoilers 24 may comprise plates/surfaces disposed on the top side of wings 14 and that can be deflected or extended into the airflow to spoil the airflow. Spoilers 24 may be configured to reduce lift as well as increase drag on landing of aircraft 10 for example. Spoilers 24 may be deployed at controlled angles (typically expressed in degrees) during flight to increase a descent rate or control roll. Spoilers 24A may be movably mounted to port-side wing 14A and spoilers 24B may be movably mounted to starboard-side wing 14B. In some embodiments, some of spoilers 24 (e.g., multi-function spoilers, spoilerons) may be deployed at controlled angles during flight to increase descent rate or control roll while other spoilers 24 (e.g., ground spoilers) may be fully deployed immediately on landing to greatly reduce lift and increase drag. In some embodiments of aircraft 10, multi-function spoilers may be disposed outboard of ground spoilers on respective wings 14A, 14B.

FIG. 1 schematically shows system 12 superimposed on aircraft 10 where system 12 may be associated with spoilers 24A movably attached to port-side wing 14A and also with spoilers 24B movably attached to starboard-side wing 14B. As illustrated in FIG. 1, system 12 may be associated with some or all of spoilers 24 of each wing 14. For example, system 12 may be associated with both inboard and outboard spoilers 24 of each wing 14 relative to fuselage 14. However, it is understood that in some embodiments, system 12 could be associated with only one or some (e.g., inboard or outboard) spoilers 24 of each wing 14. For example, in some embodiments, system 12 may be associated with inboard multi-function spoilers located laterally between ground spoilers and outboard multi-function spoilers.

Even though the present disclosure relates mainly to the use of spoiler deployment for improving the operation of aircraft 10 at relatively high speed, it is understood that, in various situations and wing designs, the deployment of other flight control surfaces could also be used to mitigate the effects of flow separation in order to achieve some improvement in static lateral stability, buffet boundary and/or drag reduction. The selection of which flight control surface(s) to deploy may be based on the characteristics of wings 14 and the location(s) of flow separation on wings 14. Accordingly, it is understood that system 12 may be associated with other flight control surfaces such as trailing edge flaps 26 and/or ailerons 20 that are movably attached to wings 14.

Figure 2:
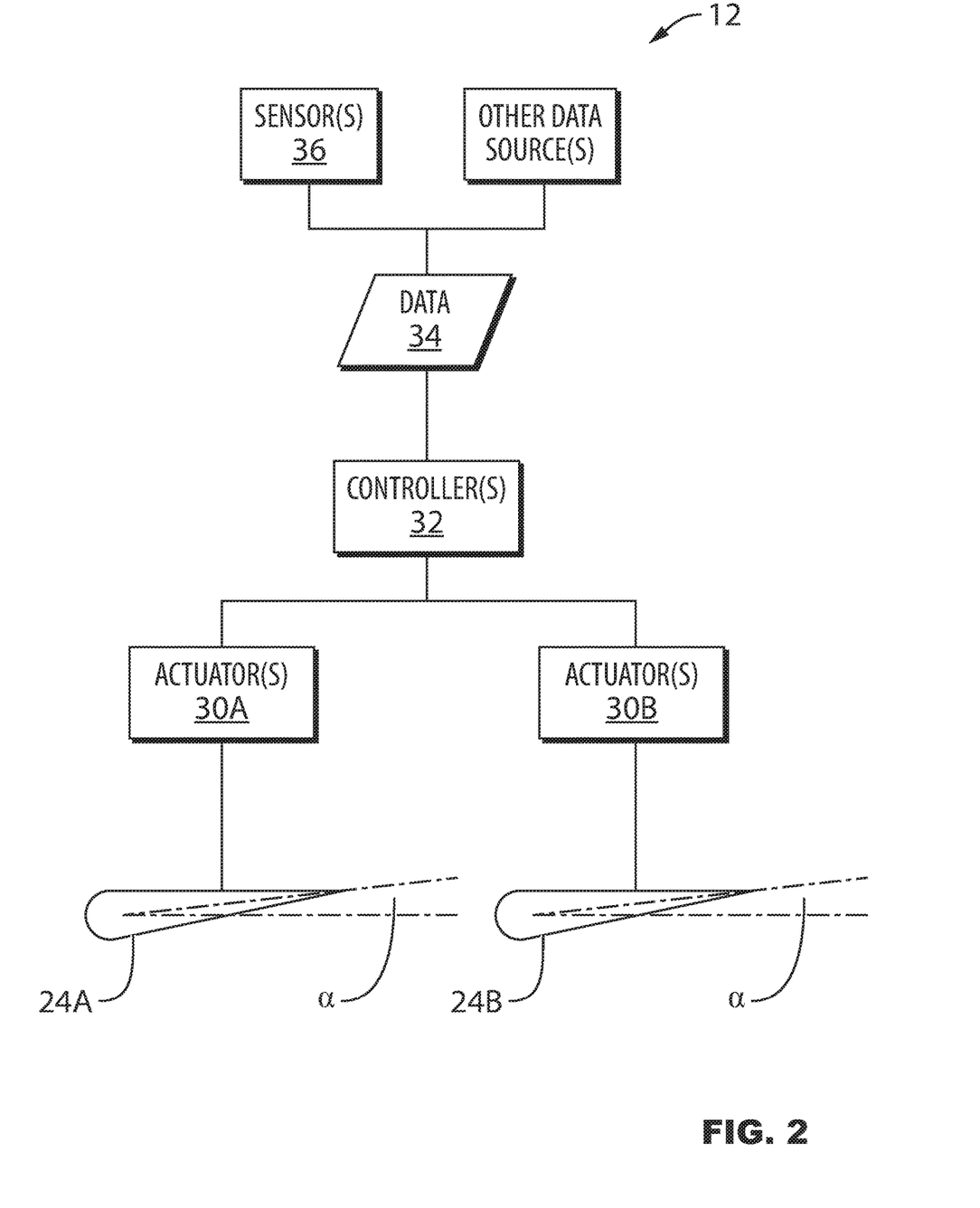
FIG. 2 is a schematic representation of an exemplary system for improving the operation of the aircraft of FIG. 1.

FIG. 2 is a schematic representation of an exemplary system 12 for improving the operation (e.g., static lateral stability, increase in buffet boundary, drag reduction) of aircraft 10. In some embodiments, system 12 may be used specifically during a cruise phase of flight of aircraft 10 at speeds approaching $M_{MO}$ and at $M_{MO}$. System 12 is illustrated in FIG. 2 together with only one spoiler 24 of each wing 14 for simplicity but it is understood that system 12 can be associated with some or all spoilers 24 of both wings 14 and/or with other flight control surfaces.

System 12 may comprise one or more actuators 30A operatively coupled to cause actuation of spoiler(s) 24A of port-side wing 14A based on instructions generated by one or more controllers 32. Similarly, system 12 may comprise one or more actuators 30B operatively coupled to cause actuation of spoiler(s) 24B of starboard-side wing 14B based on instructions generated by controller(s) 32. It is understood that aspects of the present disclosure may also be used with aircraft 10 having different spoiler configurations and actuation systems than those shown herein. For example, it is understood that, in some embodiments, a common controller 32 may control the actuation of both spoiler(s) 24A and spoilers 24B. Alternatively, in some embodiments, system 12 may comprise separate dedicated controllers 32 respectively associated with spoiler(s) 24A and spoiler(s) 24B. Actuators 30A, 30B, also referred generally herein as "actuators 30", may each comprise a suitable (e.g., pneumatic, hydraulic and electric) actuator for transmitting an actuation force to respective spoilers 24.

System 12 may comprise one or more controllers 32 (referred below in the singular). Controller 32 may be operatively coupled to spoilers 24 via actuators 30 for commanding actuation of spoilers 24. Controller 32 may be operatively coupled to also command the actuation of other flight control surfaces of aircraft 10 in some embodiments. Controller 32 may be operatively coupled to other avionics component(s) or otherwise configured to receive commands from a pilot of aircraft 10 directly or indirectly, or receive commands from an auto-flight system of aircraft 10. Controller 32 may also be operatively coupled to receive data 34 directly or indirectly from one or more suitable data sources such as sensors 36 or other avionics components. Controller 32 may be operatively coupled to a control input device located in a cockpit of aircraft 10 and actuatable by the pilot(s) to permit manually commanded actuation of spoilers 24 to different deployment settings.

Controller 32 may comprise one or more data processors and one or more computer-readable memories storing machine-readable instructions executable by the data processor(s) and configured to cause controller 32 to perform a series of steps so as to implement a computer-implemented process such that instructions, when executed by such data processor(s) or other programmable apparatus, can cause the functions/acts specified in the methods described herein to be executed. Memory(ies) can comprise any storage means (e.g. devices) suitable for retrievably storing machine-readable instructions executable by the data processor(s) of controller 32.

Various aspects of the present disclosure can be embodied as systems, devices, methods and/or computer program products. Accordingly, aspects of the present disclosure can take the form of an entirely hardware embodiment, an entirely software embodiment or an embodiment combining software and hardware aspects. Furthermore, aspects of the present disclosure can take the form of a computer program product embodied in one or more non-transitory computer readable medium(ia) having computer readable program code embodied thereon. The computer program product can, for example, be executed by controller 32 to cause the execution of one or more methods disclosed herein in entirety or in part. It is understood that, based on the present disclosure, one skilled in the relevant arts could readily write computer program code for implementing the methods disclosed herein.

Controller 32 may be operatively coupled to spoilers 24 for commanding deployment and retraction of spoilers 24 in unison and cause symmetric deployment of spoilers 24A and 24B between port-side wing 14A and starboard-side wing 14B. In various embodiments, controller 32 may be dedicated to the actuation of spoilers 24 or may be configured to carry out other tasks as well. In some embodiments, controller 32 may comprise or be integrated with a flight control computer (FCC) of a fly-by-wire system of aircraft 10 for example. Controller 32 may be configured to automatically command deployment and retraction of spoilers 24 based on data 34 and one or more suitable control laws. The methods disclosed herein may be implemented on new aircraft designs or retrofitted to an existing aircraft without making significant structural modifications to such existing aircraft.

Data 34 may comprise information indicative of a current state or operating condition of aircraft 10. Data 34 may comprise one or more substantially real-time stored or sensed parameters acquired via suitable sensor(s) 36, one or more computed/derived parameters and one or more predetermined threshold values for example. In various embodiments, data 34 may comprise current speed (e.g., airspeed, Mach number), phase of flight, aircraft weight, altitude, a deployment angle α of spoilers 24 and predetermined threshold values (e.g., limits, altitude ranges, spoiler-deployment trigger speeds, spoiler-retraction trigger speeds, $M_{MO}$).

Some or all of data 34 may be available to controller 32 to permit controller 32 to perform the tasks described herein. It is understood that some of data 34 could instead be computed/derived by controller 32 or could be stored in memory that is accessible by controller 32. Deployment angle α of spoilers 24 is shown in FIG. 2 relative to a fully retracted position of spoilers 24. Spoilers 24 may be actuatable between and including a fully retracted position (i.e., α=0 degree) and a fully deployed position (e.g., α=40 degrees). Spoilers 24 may be configured to be actuated to and held at intermediate positions between the fully retracted position and the fully deployed position.

Figure 3:
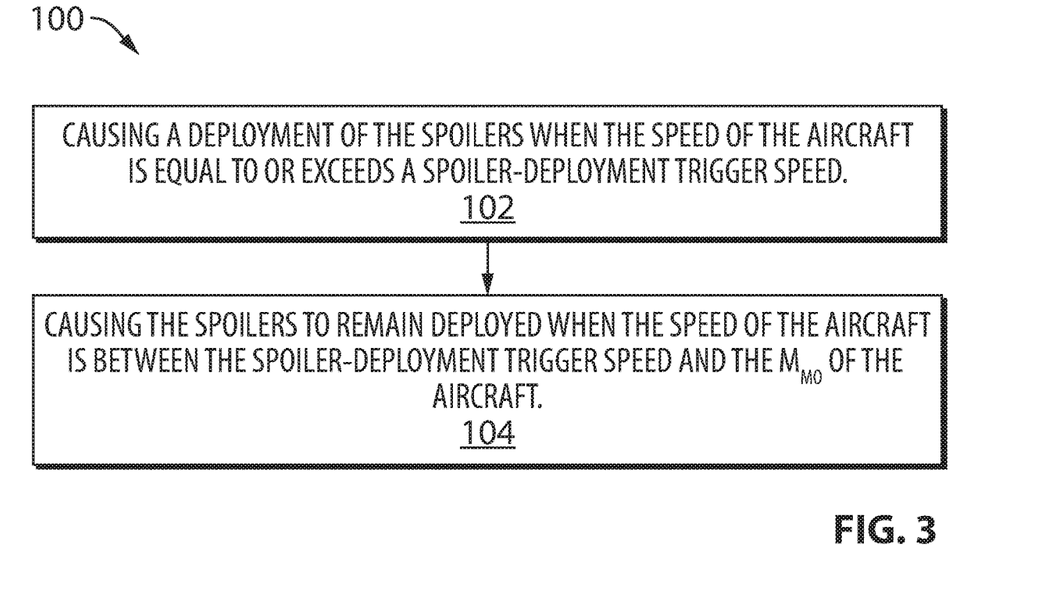
FIG. 3 is a flow diagram illustrating an exemplary method for improving the operation of the aircraft of FIG. 1.

FIG. 3 is a flow diagram illustrating an exemplary method 100 for improving the operation (e.g., static lateral stability, buffet boundary, drag) of aircraft 10. Method 100 can be performed using system 12 as described above or using another suitable system. Method 100 may be computer-implemented via controller 32 for example. Method 100 may be implemented by way of one or more control laws associated with system 12. Aspects and functions of system 12 disclosed herein can also be applicable to method 100. Method 100 may comprise: using data 34 indicative of a speed of aircraft 10 during flight, automatically causing a deployment of flight control surfaces (e.g., spoilers 24) movably attached to wings 14 of aircraft 10 when the speed of aircraft 10 is equal to or exceeds a (e.g., spoiler-) deployment trigger speed that is lower than the $M_{MO}$ of aircraft 10 (see block 102); and causing the flight control surfaces (e.g., spoilers 24) to remain deployed when the speed of aircraft 10 is between the (e.g., spoiler-) deployment trigger speed and the $M_{MO}$ of aircraft 10 (see block 104).

In various embodiments, the flight control surfaces used in method 100 may be spoilers 24, flaps 26 and/or ailerons 20. For example, in some embodiments, method 100 may deploy only (exclusively) spoilers 24 to achieve the desired operational improvement. In some embodiments, method 100 may deploy only (exclusively) flaps 26 to achieve the desired operational improvement. In some embodiments, method 100 may deploy only (exclusively) ailerons 20 to achieve the desired operational improvement. In some embodiments, method 100 may deploy only (exclusively) spoilerons to achieve the desired operational improvement. In some embodiments, method 100 may make use of simultaneous deployment of one or more types of flight control surfaces to achieve the desired operational improvement based on the location and characteristics of the flow separation on wings 14. In various embodiments of method 100, the flight control surface deployment may be symmetrical between port-side wing 14A and starboard-side wing 14B.

Even though aspects of method 100 described below are described in relation to spoilers 24, it is understood that such aspects can be applicable to other types of flight control surfaces of aircraft 10.

In some embodiments, the automatic deployment (and subsequent retraction) of spoilers 24 may be carried out without explicit instruction from the pilot(s) of aircraft 10. For example, the automatic deployment (and subsequent retraction) of spoilers 24 could be carried out without pilot input and be transparent to the pilot(s) of aircraft 10.

In various embodiments, all or only some of spoilers 24 may be deployed as part of method 100 to improve the operation (e.g., lateral stability, buffet boundary, drag) of aircraft 10. In some embodiments, only multi-function spoilers of each wing 14 may be deployed as part of method 100 to improve the operation of aircraft 10 while ground spoilers remain retracted. In some embodiments, only one or more inboard multi-function spoilers of each wing 14 may be deployed as part of method 100 to improve the static lateral stability of aircraft 10 while ground spoilers and other outboard multi-function spoilers remain retracted. The inboard multi-function spoilers may be disposed between the outboard multi-function spoilers and the ground spoilers along a spanwise direction of each wing 14.

In various embodiments, the deployment of spoilers 24 may include deploying one or more spoilers 24A of port-side wing 14A of aircraft 10 and one or more counterpart spoilers 24B of starboard-side wing 14B of aircraft to a same deployment amount (e.g., by the same deployment angle α shown in FIG. 2). Accordingly, spoiler deployment may be symmetrical between port-side wing 14A and starboard-side wing 14B.

The amount of spoiler deployment required to improve the operation of aircraft 10 may be relatively small and may depend on the specific aircraft and the effect desired. The selection of which spoiler(s) 24 to deploy and by what deployment angle α may be dependent on the specific aircraft and on the location and size of the shock-induced flow separation region on one or both wings 14. In some situations, since the amount of spoiler deployment required to improve the operation of aircraft 10 at high speed may be relatively small, the spoiler deployment may consequently not prohibitively increase drag. In some situation, the mitigation of the effects of shock-induced flow separation provided by the deployment of spoilers 24 may be substantially drag neutral (or drag reducing) under the applicable operating conditions. For example, even though the slightly deployed spoilers 24 would extend into the air flow over the wings 14, the slightly deployed spoilers 24 would also, in some embodiments, reduce shock strength in some regions and hence reduce the shock-induced flow separation in one or more critical areas of one or both wings 14. Furthermore, the spoiler deployments can be tailored in such fashion as to modify the span-wise distribution of lift on the wing 14 in these flow conditions thereby reducing the induced drag of aircraft 10.

In some embodiments, the required spoiler deployment angle α may be predetermined experimentally or by modelling/simulation based on the operating conditions and applicable performance requirements. In some embodiments, the deployment angle α for method 100 may be a fixed/constant (i.e., non-variable) value that is triggered based on speed of aircraft, and optionally also based on the phase of flight, irrespective of other parameters. Accordingly, the same fixed value of deployment angle α may be used repeatedly at the applicable times during a same flight and during different flights.

In some embodiments, once spoilers 24 have been deployed in method 100, they may not be actively controlled/modulated during maneuvers based on any other parameter(s). For example, the deployment of spoilers 24 may be triggered at the spoiler-deployment trigger speed and then kept deployed (i.e., held) to the fixed deployment amount while the speed of aircraft 10 is between the spoiler-deployment trigger speed and the $M_{MO}$ of aircraft 10. Spoilers 24 may also be kept deployed (i.e., held) while the speed of aircraft 10 is substantially at $M_{MO}$ of aircraft 10.

Method 100 may also comprise, after causing spoilers 24 to remain deployed at the fixed deployment angle α at the applicable speed(s), causing spoilers 24 to automatically fully retract when the speed of aircraft 10 is below the spoiler-deployment trigger speed. In some embodiments, a spoiler-retraction trigger speed may be used to trigger the retraction of spoilers 24. Such spoiler-retraction trigger speed may be slightly lower than the spoiler-deployment trigger speed to provide a deadband and prevent oscillation of spoilers 24 around the applicable trigger speeds.

In some embodiments of method 100, a spoiler deployment angle α of about 5 degrees may provide some operational improvement. In a case where a maximum deployment angle of the applicable spoilers 24 may be about 40 degrees, a 5-degree deployment may correspond to about 12.5% of the maximum deployment angle of the applicable spoilers 24. In some embodiments, a suitable spoiler deployment angle α may be between about 3 degrees and about 10 degrees. In some embodiments, a suitable spoiler deployment angle α may be less than about 10 degrees. In some embodiments, a suitable spoiler deployment angle α may be less than about 15 degrees. In terms of a percentage of a maximum deployment amount of the applicable spoilers, a suitable spoiler deployment amount for method 100 may be between about 6% and about 20% of the maximum deployment amount of the applicable spoilers 24. In some embodiments, a suitable spoiler deployment amount for method 100 may be between about 10% and about 15% of the maximum deployment amount of the applicable spoilers 24. In some embodiments, a suitable spoiler deployment amount may be less than about 20% of the maximum deployment amount of the applicable spoilers 24. In some embodiments, a suitable spoiler deployment amount may be less than about 30% of the maximum deployment amount of the applicable spoilers 24.

As explained above, the automatic deployment of spoilers 24 may be triggered by the speed of the aircraft being equal to or exceeding the spoiler-deployment trigger speed. However, another optional condition may be based on a phase of flight of aircraft 10. For example, method 100 may be used during a cruise phase of flight so as to allow for the use of a higher $M_{MO}$ for aircraft 10 than would otherwise be mandated without such deployment of spoilers 24. In reference to FIG. 2, data 34 may comprise data representative of the current phase of flight of aircraft 10.

Figure 4:
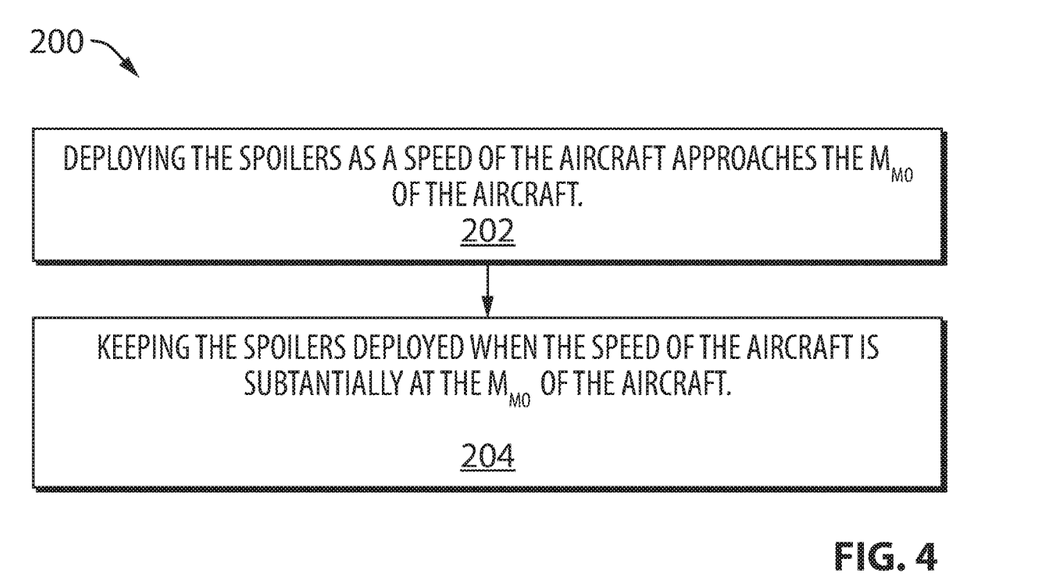
FIG. 4 is a flow diagram illustrating another exemplary method for improving the operation of the aircraft of FIG. 1.

FIG. 4 is a flow diagram illustrating another exemplary method 200 for improving the operation (e.g., lateral stability, buffet boundary, drag) of aircraft 10. Method 200 can be performed using system 12 as described above or using another suitable system. Method 200 may be computer-implemented via controller 32 for example. Method 200 may be implemented by way of one or more control laws associated with system 12. Aspects and functions of system 12 and of method 100 disclosed herein can also be applicable to method 200. Again, even though aspects of method 200 are described in relation to spoilers 24, it is understood that such aspects can be applicable to other types of flight control surfaces. Method 200 may comprise: deploying spoilers 24 movably attached to wings 14 of aircraft 10 as a speed of aircraft 10 approaches $M_{MO}$ of aircraft 10 (see block 202); and keeping spoilers 24 deployed when the speed of aircraft 10 is substantially at $M_{MO}$ of aircraft 10.

Figure 5:
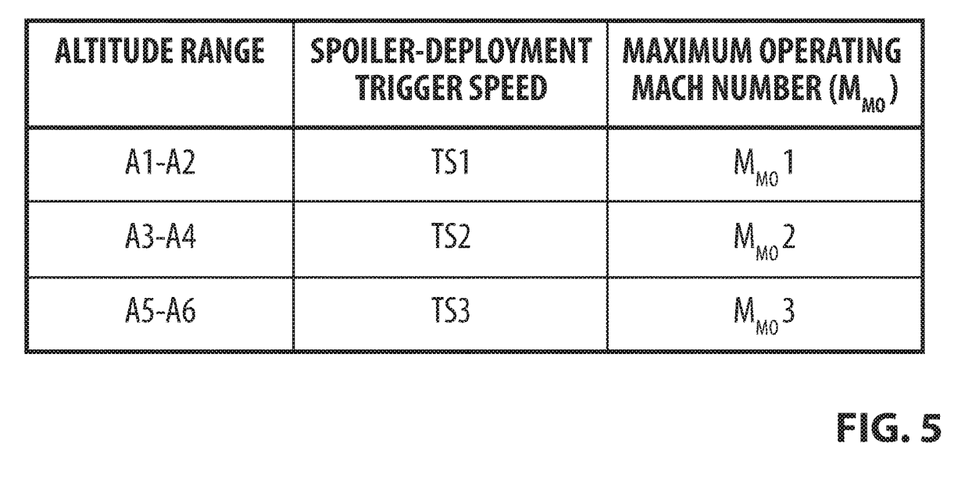
FIG. 5 is a table illustrating different spoiler-deployment trigger speeds and corresponding maximum operating Mach numbers of the aircraft of FIG. 1 for different altitude ranges.

FIG. 5 is a table illustrating different spoiler-deployment trigger speeds (TS1-TS3) and corresponding maximum operating Mach numbers ($M_{MO}1$-$M_{MO}3$) of aircraft 10 for different altitude ranges. The methods disclosed herein may be performed at relatively high altitudes where $M_{MO}$ is the limiting speed of aircraft 10. Since the stall speed of an aircraft can vary based on altitude due to changes in environmental conditions and to the speed of sound with altitude, it is understood that the $M_{MO}$ of aircraft 10 can vary based on altitude. In reference to FIG. 5, altitude range A3-A4 is intended to be higher than altitude range A1-A2 and altitude range A5-A6 is intended to be higher than altitude range A3-A4. Since the $M_{MO}$ of aircraft 10 can decrease with increasing altitude, $M_{MO}2$ may be lower than $M_{MO}1$ and $M_{MO}3$ may be lower than $M_{MO}2$.

Due to the variation of $M_{MO}$ with altitude, a different spoiler-deployment trigger speed TS1-TS3 may be associated with each $M_{MO}$. The applicable spoiler-deployment trigger speed may be lower than its associated $M_{MO}$. In some embodiments, the applicable spoiler-deployment trigger speed may be slightly lower than $M_{MO}$. In some embodiments, the spoiler-deployment trigger speed may correspond to an alternate and lower $M_{MO}$ that would be mandated without deployment of spoilers 24 as explained herein. For example, the spoiler-deployment trigger speed may correspond to a threshold speed of aircraft 10 above which deployment of spoilers 24 is required to maintain a desired lateral stability of aircraft 10. In some embodiments, the spoiler-deployment trigger speed may be within about 8% of the $M_{MO}$ of aircraft 10. In some embodiments, the spoiler-deployment trigger speed may be within about 2% of the $M_{MO}$ of aircraft 10. In some embodiments, the spoiler-deployment trigger speed may be between about 0.25% and about 12% of the $M_{MO}$ of aircraft 10. In some embodiments, the spoiler-deployment trigger speed may be between about 0.5% and about 5% of the $M_{MO}$ of aircraft 10.

Data 34 (see FIG. 2) may include data having the form of the table of FIG. 5 that may be used by controller 32 to determine the applicable $M_{MO}$ and corresponding spoiler-deployment trigger speed based on the current altitude for the purpose of triggering the deployment of spoilers 24 accordingly. It is understood that the table of FIG. 5 may also include corresponding spoiler-retraction trigger speed as explained above. The table of FIG. 5 may have the form of an electronic look-up table available to controller 32.

Figure 6A:
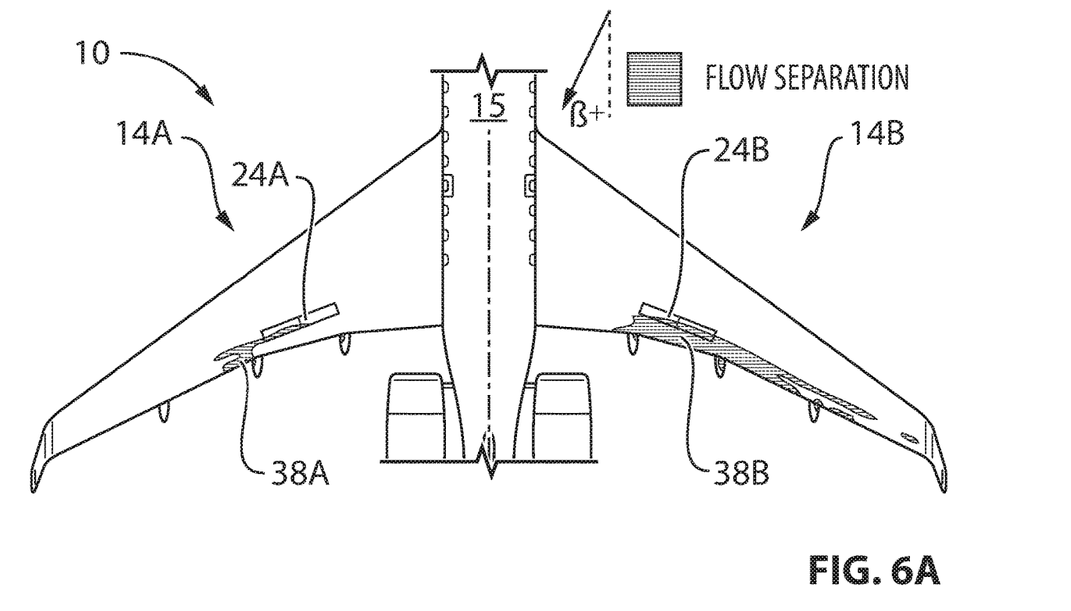
FIG. 6A is a top plan view of part of the aircraft of FIG. 1 showing areas of flow separation when the aircraft is in a side slip condition with spoilers of the aircraft not deployed.
Figure 6B:
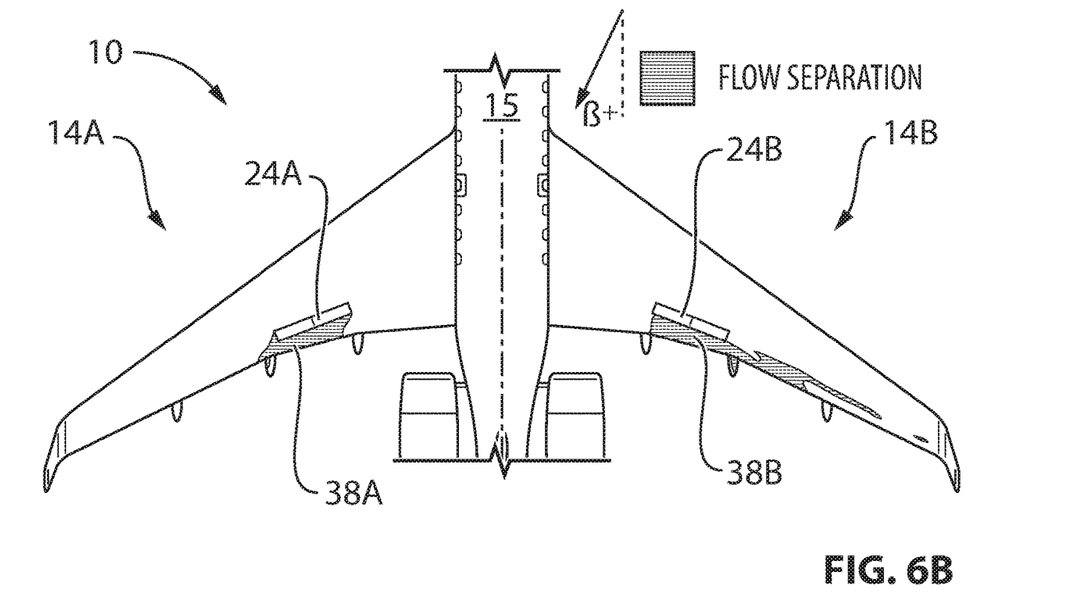
FIG. 6B is a top plan view of the part of the aircraft of FIG. 1 showing areas of flow separation when the aircraft is in a side slip condition with the spoilers of the aircraft deployed.

FIGS. 6A and 6B are top plan views of part of aircraft 10 showing regions 38A, 38B of flow separation on wings 14A, 14B when aircraft 10 is in a side slip condition with spoilers 24 of aircraft 10 not deployed in FIG. 6A and deployed to 5 degrees in FIG. 6B. The conditions applicable to FIGS. 6A and 6B include a speed of aircraft 10 of Mach 0.900, an angle of attack of 0 degree and a side slip angle β of 2.5 degrees in the direction shown in FIGS. 6A, 6B. Accordingly, starboard-side wing 14B is shown as the leading wing relative to the airflow and port-side wing 14A is shown as the trailing wing. FIGS. 6A and 6B were generated by simulation/modelling.

Regions 38A and 38B of flow separation are shown in dark regions on top of wings 14A, 14B. In reference to FIG. 6A where spoilers 24 are retracted (α=0 degree), the size of region 38B on starboard-side wing 14B is shown to be significantly larger than the size of region 38B on port-side wing 14A. Such difference in size of regions 38A, 38B can be indicative of a lift differential between wings 14A, 14B and can consequently be a source of lateral instability of aircraft 10 in the situation illustrated.

In reference to FIG. 6B where (e.g., inboard multi-function) spoilers 24 are deployed to a deployment angle α of 5 degrees, region 38B of flow separation on wing 14B is shown to have reduced in size due to the deployment of spoiler(s) 24B compared to the situation of FIG. 6A. Consequently, the lift generated by wing 14B may be higher in the situation of FIG. 6B than in the situation of FIG. 6A. Conversely, region 38A of flow separation on wing 14A is shown to have increased in size due to the deployment of spoiler(s) 24A compared to the situation of FIG. 6A. Consequently, the lift generated by wing 14A may be lower in the situation of FIG. 6B than in the situation of FIG. 6A. The reduction in size of the region 38B combined with the increase in size of region 38A can be indicative of a reduction in magnitude of the lift differential between wings 14A, 14B and can consequently be indicative of the static lateral stability being improved in the situation of FIG. 6B compared to the situation of FIG. 6A.

The improvement in static lateral stability was achieved by a relatively small symmetric deployment of spoilers 24A, 24B even though the sizes of regions 38A, 38B was asymmetric between wings 14A, 14B. Since the small deployment of spoilers 24 is intended to be used at speeds above the spoiler-deployment trigger speed, it is believed that the methods disclosed herein would not affect a long-range cruise performance of aircraft 10 when operating at a cruise speed that is below the spoiler-deployment trigger speed.

Referring to the reduction in size of region 38B from FIG. 6A to FIG. 6B due to the deployment of spoiler(s) 24B, it is believed that, in some situations, such reduction in size of region 38B could be accompanied by a reduction in drag and increase in a buffet boundary. It is understood that the size and characteristics of the area(s) of flow separation can be used to determine which flight control surface(s) would be appropriate to use to mitigate the effects of such flow separation and thereby improve the operation of aircraft 10. Mitigating the effects of flow separation may include altering a lift distribution across one or both wings 14A, 14B by way of a relatively small but symmetric deployment of one or more flight control surfaces of wings 14A, 14B.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method of improving the stability of an aircraft during flight, the method/system comprising:
   using data indicative of a speed of the aircraft during flight,
   automatically causing a deployment of spoilers movably attached to wings of the aircraft when the speed of the aircraft is equal to or exceeds a spoiler-deployment trigger speed that is lower than a maximum operating Mach number of the aircraft; and
   causing the spoilers to remain deployed when the speed of the aircraft is between the spoiler-deployment trigger speed and the maximum operating Mach number of the aircraft.

2. The method as defined in claim 1, wherein the spoilers include a first spoiler of a port-side wing and a counterpart second spoiler of a starboard-side wing.

3. The method as defined in claim 2, wherein causing the deployment of the spoilers includes causing the first and second spoilers to be deployed to a same deployment amount.

4. The method as defined in claim 3, wherein the same deployment amount is about 12.5% of a maximum deployment amount of the spoilers.

5. The method as defined in claim 3, wherein the same deployment amount is less than 30% of a maximum deployment amount of the spoilers.

6. The method as defined in claim 3, wherein the same deployment amount is between 6% and 20% of a maximum deployment amount of the spoilers.

7. The method as defined in claim 3, wherein the same deployment amount is about 5 degrees.

8. The method as defined in claim 3, wherein the same deployment amount is less than 15 degrees.

9. The method as defined in claim 3, wherein the same deployment amount is between about 3 and 10 degrees.

10. The method as defined in claim 1, comprising automatically causing the deployment of the spoilers when the speed of the aircraft is equal to or exceeds the spoiler-deployment trigger speed and when the aircraft is in a cruise phase of flight.

11. The method as defined in claim 1, comprising, after causing the spoilers to remain deployed, causing the spoilers to fully retract when the speed of the aircraft is below the spoiler-deployment trigger speed.

12. The method as defined in claim 1, wherein the spoiler-deployment trigger speed is between 0.25% and 12% of the maximum operating Mach number of the aircraft.

13. The method as defined in claim 1, wherein the spoiler-deployment trigger speed is between 0.5% and 5% of the maximum operating Mach number of the aircraft.

14. The method as defined in claim 1, wherein automatically causing the deployment of spoilers comprises causing symmetric deployment of one or more spoilers of a port-side wing of the aircraft and one or more spoilers of a starboard-side wing of the aircraft.

15. The method as defined in claim 1, comprising keeping the spoilers deployed to a fixed deployment amount while the speed of the aircraft is between the spoiler-deployment trigger speed and the maximum operating Mach number of the aircraft.

16. A system for improving the stability of an aircraft during flight, the system comprising
one or more controllers for controlling an actuation of a plurality of spoilers movably attached to wings of the aircraft, the one or more controllers being configured to:
using data indicative of a speed of the aircraft during flight, automatically command a deployment of the spoilers when the speed of the aircraft is equal to or exceeds a spoiler-deployment trigger speed that is lower than a maximum operating Mach number of the aircraft; and
cause the spoilers to remain deployed when the speed of the aircraft is between the spoiler-deployment trigger speed and the maximum operating Mach number of the aircraft.

17. The system as defined in claim 16, wherein the spoilers include a first spoiler of a port-side wing and a counterpart second spoiler of a starboard-side wing.

18. The system as defined in claim 17, wherein automatically commanding the deployment of the spoilers includes commanding a deployment of the first and second spoilers to a same deployment amount.

19. The system as defined in claim 18, wherein the same deployment amount is between 6% and 20% of a maximum deployment amount of the spoilers.

20. The system as defined in claim 18, wherein the same deployment amount is less than 15 degrees.

21. The system as defined in claim 16, wherein the one or more controllers are configured to automatically command the deployment of the spoilers when the speed of the aircraft is equal to or exceeds the spoiler-deployment trigger speed and when the aircraft is in a cruise phase of flight.

22. The system as defined in claim 16, wherein the one or more controllers are configured to, after causing the spoilers to remain deployed, cause the spoilers to fully retract when the speed of the aircraft is below the spoiler-deployment trigger speed.

23. The system as defined in claim 16, wherein the spoiler-deployment trigger speed is between 0.25% and 12% of the maximum operating Mach number of the aircraft.

* * * * *